Sept. 19, 1933. J. J. HOPFIELD 1,927,548
CHARGING ROD
Filed April 13, 1932
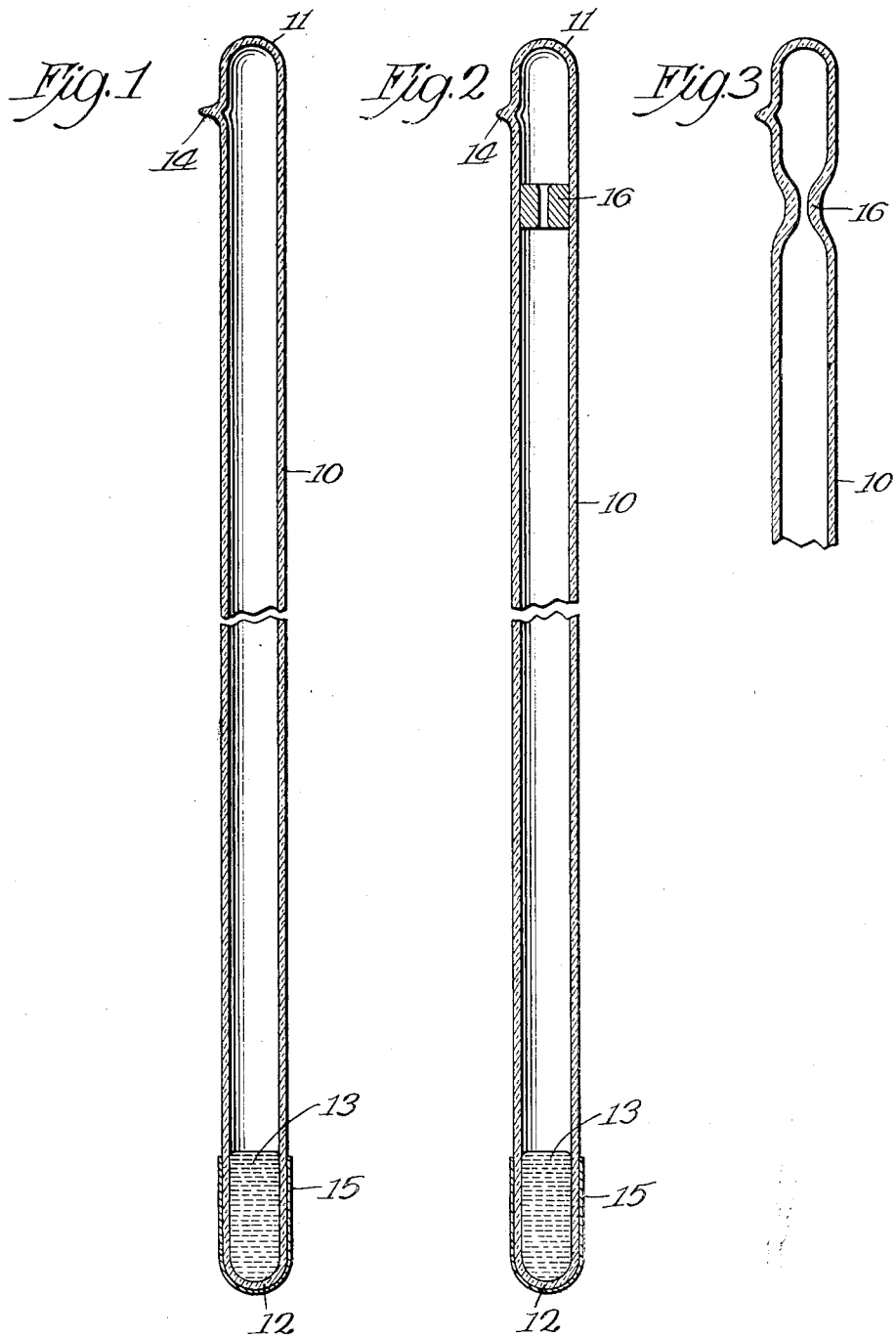
Inventor
John J. Hopfield
By Gillson, Mann &c.
Attys.

Patented Sept. 19, 1933

1,927,548

UNITED STATES PATENT OFFICE 1,927,548

CHARGING ROD

John J. Hopfield, Chicago, Ill.

Application April 13, 1932. Serial No. 605,105

5 Claims. (Cl. 171—328)

Fundamental to the subject of electrostatics are the two classic experiments in which static electricity is produced by rubbing a glass rod with silk and a rod of hard rubber with fur. In these experiments, the glass rod and the fur are charged with positive electricity and the silk and rubber with negative electricity, as may be verified by their reaction on each other and by the use of an electrometer and dry cell.

Other substances besides glass and silk, and rubber and fur produce electrification when rubbed together. Some of these substances are given in the electric series listed below, the order being such that if a given substance in the series is rubbed by some other substance further down in the series, the first substance becomes positively electrified, and the second substance negatively electrified.

But the rule is not invariable as will later be seen, for the electrification of a substance depends to a large extent upon such surface conditions as purity, temperature, smoothness, etc. The arrangement of substances in the series must therefore be regarded as only approximate.

The electric series, as given in Duff's "Physics", 1926 edition, is as follows:

| Fur | Glass | Metals | Resin |
|---|---|---|---|
| Wool | Silk | Hard rubber | Sulphur |
| Quartz | Wood | Sealing-wax | Gun-cotton |

The principal object of this invention is to provide a charging rod that is capable of self-inducing a charge of static electricity by merely changing its position of rest.

Further and other objects and advantages will become apparent as the disclosure proceeds and the description is read in conjunction with the accompanying drawing, in which Fig. 1 is a vertical, sectional view of a preferred form of the invention;

Fig. 2 is a vertical, sectional view of the form of invention shown in Fig. 1, the rod being equipped however, with a constriction for impeding the flow of the mobile substance within the tube; and Fig. 3 shows another method of forming the constriction.

Inasmuch as this invention contemplates the use of any mobile substance taken from the electric series in combination with a closed vessel made from material taken from some other class of the electric series, it will be distinctly understood that the specific illustration and the correspondingly specific description of preferred forms of the invention are for the purpose of disclosure only and should not be construed as limiting the appended claims except as required by the prior art.

In the preferred forms of the invention which are illustrated in the drawing, the reference character 10 designates a piece of tubing, preferably of pyrex glass approximately thirty centimeters long and 1.2 centimeters in outside diameter. The tube is closed at the top 11 and bottom 12 and encloses a small quantity of chemically pure mercury 13 which, for the dimensions of tubing given, should be approximately four or five cubic centimeters in volume.

After the mercury has been placed in the tube, a high vacuum pump is employed to evacuate the tube and the tube is then pinch sealed as shown at 14. During the evacuation, the walls of the tubing should be heated sufficiently to drive off all occluded gases held within the glass. The amount of electrification of which the charging rod is capable is functionally related to the evacuation of air from the tube.

An external electrode 15 is applied to the lower end 12 of the rod by any suitable means as, for example, by depositing a coating of platinum on the glass from a prepared solution of platinum chloride. The solution (which may be prepared by taking one gram of platinum chloride, dissolving it in three c. c. of 95% alcohol, then mixing with it ten c. c. concentrated alcoholic solution of boric acid, and thereafter adding 25 c. c. of a solution of Venetian turpentine and oil of lavender) is first applied to the rod and the latter is then gently heated in a reducing flame.

Instead of depositing the electrode on the rod, metal foil may be suitably secured to the rod to form the external electrode.

Contrary to the arrangement of substances in the electric series, it appears that when mercury is in frictional contact with glass under the conditions herein described, the former becomes positively, and the latter negatively, charged. The negative charge, however, seems to appear on the inside of the rod next to the mercury, and a positive charge is found on the outside, i. e. on the electrode 15 if the mercury is in the bottom of the tube.

To charge an electroscope with positive electricity, the charging rod is placed in an inverted position, the electrode 15 then touched with the hand, and thereafter touched to the electroscope. As the end 11 of the tube is raised while holding the electrode 15 in engagement with the electroscope, the mercury will flow the length of the